United States Patent
Buehler et al.

(10) Patent No.: US 10,596,772 B2
(45) Date of Patent: Mar. 24, 2020

(54) PRODUCTION OF A PLURALITY OF DIFFERENT FIBER COMPOSITE COMPONENTS FOR HIGH VOLUMES IN A CONTINUOUS PROCESS

(71) Applicant: Evonik Roehm GmbH, Darmstadt (DE)

(72) Inventors: Sebastian Buehler, Freiburg (DE); Sivakumara K. Krishnamoorthy, Pfungstadt (DE); Mark Reinhard Berlin, Recklinghausen (DE); Karl-Heinz Semlitsch, Muerzzuschlag (AT)

(73) Assignee: Evonik Operations GmbH, Essen (DE)

( * ) Notice: Subject to any disclaimer, the term of this patent is extended or adjusted under 35 U.S.C. 154(b) by 194 days.

(21) Appl. No.: 15/522,050

(22) PCT Filed: Oct. 22, 2015

(86) PCT No.: PCT/EP2015/074427
§ 371 (c)(1),
(2) Date: Apr. 26, 2017

(87) PCT Pub. No.: WO2016/066510
PCT Pub. Date: May 6, 2016

(65) Prior Publication Data
US 2017/0334155 A1    Nov. 23, 2017

(30) Foreign Application Priority Data
Oct. 27, 2014    (EP) .................................... 14190487

(51) Int. Cl.
*B29C 70/86*    (2006.01)
*B29C 70/46*    (2006.01)
(Continued)

(52) U.S. Cl.
CPC ............ *B29C 70/865* (2013.01); *B29C 70/46* (2013.01); *B29C 70/52* (2013.01); *B29C 70/525* (2013.01);
(Continued)

(58) Field of Classification Search
CPC ....... B29C 70/865; B29C 70/46; B29C 70/52; B29C 70/521–528; B29C 33/34; B29C 33/36; B29C 43/26
See application file for complete search history.

(56) References Cited

U.S. PATENT DOCUMENTS

| | | | |
|---|---|---|---|
| 3,807,548 A | 4/1974 | Bergeron | |
| 5,286,320 A | 2/1994 | McGrath et al. | |

(Continued)

FOREIGN PATENT DOCUMENTS

| | | |
|---|---|---|
| DE | 299 13 877 U1 | 11/1999 |
| DE | 10 2012 208 428 A1 | 11/2013 |

(Continued)

OTHER PUBLICATIONS

U.S. Appl. No. 14/402,446, filed Nov. 20, 2014, US 2015-0151496 A1, Arnim Kraatz et al.

(Continued)

*Primary Examiner* — Peter L Vajda
*Assistant Examiner* — S. Behrooz Ghorishi
(74) *Attorney, Agent, or Firm* — Oblon, McClelland, Maier & Neustadt, L.L.P.

(57) ABSTRACT

The present invention relates to a novel process for the production of novel fibre-reinforced profile materials filled with a rigid foam core, especially a PMI foam core. In particular, the present invention relates to a novel process which, in various versions, provides a particularly high throughput and allows a very wide range of shaping options. One step here continuously produces a complex fibre-reinforced profile material and simultaneously inserts the rigid foam core into same. In addition, in the same process step, very good binding of the rigid foam core to the fibre-reinforced profile material is assured. Shaping further takes place in two or more moulds simultaneously to achieve (Continued)

a particularly high throughput and simultaneously produce profile materials differing in shape.

11 Claims, 1 Drawing Sheet

(51) Int. Cl.
    *B29C 70/52*     (2006.01)
    *B29D 99/00*     (2010.01)
    *B29K 105/04*     (2006.01)
    *B29K 33/00*     (2006.01)

(52) U.S. Cl.
    CPC ...... *B29D 99/0003* (2013.01); *B29K 2033/00* (2013.01); *B29K 2033/26* (2013.01); *B29K 2105/04* (2013.01)

(56) References Cited

U.S. PATENT DOCUMENTS

| | | | |
|---|---|---|---|
| 10,131,097 B2 * | 11/2018 | Buehler | B29C 70/528 |
| 2002/0014302 A1 | 2/2002 | Fanucci et al. | |
| 2015/0151496 A1 | 6/2015 | Kraatz et al. | |
| 2015/0367876 A1 * | 12/2015 | Heitz | B29C 70/52 74/492 |

FOREIGN PATENT DOCUMENTS

| | | |
|---|---|---|
| JP | S52-59676 | 5/1977 |
| JP | S56-17245 | 2/1981 |
| JP | S57-82016 | 5/1982 |
| JP | H04-339635 | 11/1992 |
| JP | H06-504743 | 6/1994 |
| JP | H10-67052 | 3/1998 |
| JP | 2001-113606 A | 4/2001 |
| WO | WO 2013/174665 A1 | 11/2013 |

OTHER PUBLICATIONS

U.S. Appl. No. 15/032,927, filed Apr. 28, 2016, US 2016-0288431 A1, Sebastian Buehler et al.

International Search Report dated Jan. 28, 2016 in PCT/EP2015/074427 filed Oct. 22, 2015.

European Search Report dated Apr. 22, 2015 in European Application 14190487.0 filed Oct. 27, 2014.

* cited by examiner

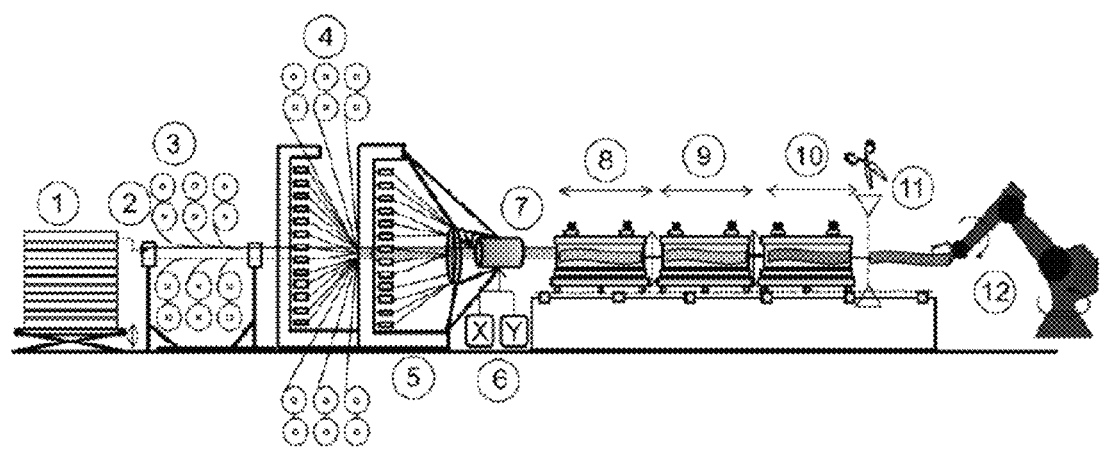

PRODUCTION OF A PLURALITY OF DIFFERENT FIBER COMPOSITE COMPONENTS FOR HIGH VOLUMES IN A CONTINUOUS PROCESS

FIELD OF THE INVENTION

The present invention relates to a novel process for the production of novel fibre-reinforced profile materials filled with a rigid foam core, especially a PMI foam core. In particular, the present invention relates to a novel process which, in various versions, provides a particularly high throughput and allows a very wide range of shaping options. One step here continuously produces a complex fibre-reinforced profile material and simultaneously inserts the rigid foam core into same. In addition, in the same process step, very good binding of the rigid foam core to the fibre-reinforced profile material is assured. Shaping further takes place in two or more moulds simultaneously to achieve a particularly high throughput and simultaneously produce profile materials differing in shape.

PRIOR ART

According to the prior art, hollow bodies comprising PMI foams can be produced by means of what is known as the in-mould process. In this, granulated material is charged to the finished hollow bodies and is then thermally foamed and thereby crosslinked. This process has the disadvantage of requiring a plurality of steps, namely production of the hollow body, charging of the granulated material and foaming. A further disadvantage is that because of the relatively high foaming temperatures of the PMI it is not possible to use thermally unstable materials, for example a composite made of carbon fibres and of an epoxy resin. Furthermore, the binding brought about between foam and outer layer during the foaming process is only weak. This type of in-mould process is described by way of example in WO 2012/013393. Alternatively according to the prior art, PUR foam fill materials are injected as liquid into the cavity and are then foamed and hardened. However, this process firstly has disadvantages similar to those of the PMI foam fill process described, and moreover is not transferable to PMI.

Alternatively, open shell parts can be filled with a cut-to-size foam core, and then a second shell part can be adhesive-bonded or welded to the first shell part to form the hollow profile. In order to improve binding of the foam core, an adhesive layer can moreover be applied at the interfaces. Disadvantages of this process are that a very large number of time-consuming steps are required, that the final product has joins, and that a large quantity of offcut material can arise during the production of the foam core, depending on the shape of same.

In one variant described in WO 2012/052219, the foam core is placed together with the textile material—for example carbon fibres—in a mould, and the resin—e.g. epoxy resin—is injected into this mould and hardened. Although this process avoids joins, it achieves this at the cost of disadvantages the same as those of the process described previously in relation to offcut material, process speed and complexity.

The pultrusion process is an established process based on original developments at the beginning of the 1950s. The pultrusion process is used to produce continuously fibre-reinforced plastics profiles, examples of which include hollow profiles, in particular tubes. Originally this process used a polyester resin or an epoxy resin to impregnate a plurality of glass fibres (glass rovings), which were then combined by way of one or more shaping moulds into the final shape. Finally, the resin is hardened and the continuously produced profile is sawn into individual workpieces.

In particular, the pultrusion process is a process which permits saturation of a plurality of fibres or rovings with a resin in a first process step. A distinction is drawn here between what is known as an open pultrusion process in which this resin saturation takes place in a saturation trough through which the fibres are passed and a closed process in which the saturation with the resin takes place only at a later stage, in the actual shaping instrument, under pressure. The plants generally have presaturation devices such as cardin grids, by means of which the fibres are distributed in the way necessary for subsequent shaping and optionally provided rovings can be parted into individual fibres. It is also possible to use nonwoven fabrics, woven fabrics and/or laid scrims as fibre material as an alternative to, or in addition to, rovings and/or fibres.

The International Patent Application WO 2013/174665 describes what is known as a pul-core process for the production of profiles with a foam core and with composite sheathing. However, this type of process is restricted to the production of non-varying, e.g. tubular, cross sections. More complex shapes, e.g. in the simplest case variations of cross section in the profile material, can be realized according to the prior art only by means of a time-consuming hand layup process or a batch RTM (resin transfer moulding) process.

European patent application having filing reference 13190866 discloses pul-shape and pul-press methods for production of fibre-reinforced and foam core-filled profiles. This process is much quicker than all the other processes disclosed in the prior art and leads to a distinct increase in production volumes. However, even this effectivity is still not optimal because no more than 30 to 50 profiles are obtainable in this way per hour.

PROBLEM

The main problem addressed by the present invention was that chiefly that of providing a novel, continuous process for producing fibre-reinforced profiles filled with a rigid foam material, for example a PMI foam, which is even suitable for complex shapes or variations in the cross section of the workpiece and which leads to particularly high throughputs as compared with the prior art.

A particular problem addressed by the present invention was that of providing a process with which complex profiles can be achieved in sandwich design with outer FPC (fibre-plastic-composite) skin and rigid foam cores, especially poly(meth)acrylimide (P(M)I) foam cores, in particularly large numbers of pieces. A particularly large yield in this context is to be understood as meaning, for example, that a single plant is capable of hourly producing at least 50 profiles having a normal thickness for the fiber-reinforced outer skin. A particular partial problem addressed in this connection was that of using the process to produce at least 70 of these profiles per hour.

The problem addressed by the present invention was further that of producing 2 or more different profiles having different shapes without stopping and revamping the plant.

Another problem addressed by the present invention was that of providing a process which permits very good binding between foam core and exterior outer layers. It is additionally to be possible by means of the process according to the invention to use, as outer material, even materials that are not heat-resistant at the foaming temperature of the PMI.

Another object of the present invention was to provide novel hollow profiles which are filled with a rigid foam and which a) have no adhesive layer between outer material of the hollow profile and the rigid foam core, b) have no joins and c) have good binding between outer material and rigid foam core.

Other objects not explicitly mentioned at this point can be apparent from the description, the drawings and/or the examples.

Solution

The problems are solved by means of a novel process for continuously producing complex, fibre-reinforced profiles filled with a rigid foam core, especially a P(M)I foam core, preferably a PMI foam core. The first steps in this process are a pultrusion process, in which a foam core made of PMI for example is introduced in the middle, and the final steps are an operation more similar to the RTM process. A foam core is wrapped or covered with a fibre material here preferably by means of a process analogous to the pultrusion process, but said fibre material here is not already saturated with a resin. The saturation with the resin to form the outer layer made of the fibre material and of the resin, which can be a thermoplastic or a reactive resin that forms a thermoset, preferably takes place, and in this case in contrast to the known pultrusion process, only after the wrapping of the foam core. Although according to the invention the saturation of the fibre material with the resin can also take place before the wrapping, e.g. by passing the fibres through a trough of resin, this procedure has the disadvantage of an additional process step in comparison with the preferred embodiment.

The particular feature of the novel process herein as compared with the prior art is that the shaping after the wrapping with the fibre material takes place simultaneously in two or more moulds, in particular in two or three moulds. Nearly double or even many times the numbers can thus be produced in the same time. The time-limiting factor in the prior art is the carriage-mounted mould for shaping and for optional hardening of the resin.

The process of the present invention comprises in particular the following steps:
a) introduction of foam cores and connecting of the newly introduced foam core to the end of the most recently introduced foam core, in a pultrusion plant,
b) wrapping a fibre material around the foam core,
c) impregnation of the fibre-material wrap with a resin,
d) simultaneous insertion of different portions of the wrapped foam core in two or more moulds, wherein these moulds are situated on rowed mould carriages or in a row on one mould carriage in position 1 at the downstream end of the poltrusion plant, and closing the moulds,
e) heating the moulds to shape the wrapped foam core and optionally cure the resin,
f) transporting the carriages in the direction of transport of the wrapped foam core into a position 2 and then opening the moulds,
g) closing a transporting mould on a further carriage, in position 2a, which is situated, viewed in the direction of transport of the wrapped foam core, behind the other carriage and transporting the wrapped foam core in the direction of transport into a position 1a, and also returning the mould carriages to position 1,
h) opening the transporting carriage, separating individual profiles by cutting, sawing or some other method and removing the final workpiece, and also concurrent practice of process steps a) to d).

Process step c) excepted, the individual process steps take place in the stated order and/or concurrently. As already described, process step c) may perfectly well take place before process step b). In this embodiment of the invention, the fibres can first be conducted through an impregnation apparatus, such as an impregnation bath, and then wrapped around the foam core.

Alternatively and preferably, process step c) takes place between process steps d) and e) by impregnating within the mould after closing the moulds and before heating. This particularly preferred embodiment of the process is a variant that may be termed a pul-shape process. In this pul-shape process, process steps c), d), e) and f) are carried out in the same general purpose moulds. This mould is therefore a device which moves on carriages and which is heatable and into which the resin is passed. The following therefore take place simultaneously in said shaping mould: the final shaping, the hardening of the resin, a calibration process and the transport. The calibration process here means relatively brief heat-conditioning of the resin composition. Particularly this variant allows the realization of higher degrees of forming and a low level of offcut material.

A somewhat less preferable alternative to the pul-shape process is the pul-press process. In this pul-press process, process steps a) to d) are carried out in mutually separate moulds/devices, optionally the wrapped foam core is pre-shaped in further moulds between process steps c) and d). Furthermore, process step c) is mandated here to take place before process step b).

The process of the present invention is preferably designed such that process steps d) to f) are carried out concurrently in two or three moulds.

In one particular embodiment of the invention, the moulds of process steps d) to f) produce different shapes. The process is thus capable of providing end product having different profiles.

Process step a): Since, in contrast to the fibre material, the foam core cannot be provided on rolls with several hundred metres of material, this preferably takes the form of a plurality of successive individual pieces when it is continuously passed into the pultrusion plant. This can take place manually or in particular can be automated with use of standard-length foam pieces. These individual pieces are then preferably connected to one another by means of adhesive bonding or insertion or through addition of a coupling piece. In the case of insertion, the foam cores can have been prefabricated with appropriate grooves or recesses for this purpose. In the case of adhesive bonding it is important that the corresponding adhesive hardens rapidly. The application of the adhesive to one of the surfaces for this purpose can take place manually, even in the case of continuous operation. There can in turn be prefabricated coupling pieces located at each of the two ends of the foam core pieces provided. The second foam core piece is then simply moved into said coupling piece. Another possible alternative is two-part coupling pieces which are located in complementary manner at the two ends of the foam workpiece and which can by way of example be connected to one another by way of a simple click mechanism. Ideally, these click points are points in the foam core that are positioned between two finished profiles at a later stage.

Process step b): The selection of the suitable fibre material used in process step b) to wrap the foam core presents no problem to the person skilled in the art, because the fibre materials that can be processed are known from established pultrusion technology. It is preferable that the fibre material comprises carbon fibres, glass fibres, polymer fibres, in particular aramid fibres, or textile fibres, more preferably aramid or carbon fibres. The fibre material used can take the form of individual fibres, rovings and/or nonwovens, wovens and/or scrims. It is preferable that the fibre material used takes the form of continuous filament fibres or of continuous rovings.

In the shaping process it is possible that the orientation of the fibres is parallel to one another in the direction of processing, around the foam core. However, it is preferable that the fibres form a textile structure around the foam core. This design achieves particular mechanical strength of the subsequent workpiece. Particular variants of process step b), such as especially modified pul-preforming, pul-winding or pul-braiding processes, can likewise be used here in accordance with the invention. It is also possible to combine a plurality of these variants with one another, or to install multiple individual variants in series. For instance, an arrangement of pul-braiding, unidirectional fibre guiding and another pul-braiding operation, for example, is conceivable. Details of these variants can be found, for example, in WO 2013/174665.

In step c), impregnation with a resin takes place. The resin used, which subsequently forms the matrix material of the fibre-plastics composite shell of the profile, can be any thermoplastic material suitable for the pultrusion or any resin that can be reacted to give a thermoset after crosslinking. Preference is given to said resins that can be reacted to give a thermoset. In particular, these are polyester resins, vinyl ester resins, phenolic resins, PU resins or epoxy resins, and are more preferably PU resins or epoxy resins.

Process steps d) and e): After, or at the same time as, the impregnation with the resin, shaping of the profile, e.g. by continuous thermal shaping, can take place in process steps d) and e). This shaping can by way of example take place by use of one or more mould sleeves. The shaping moulds are more particularly compression moulds similar to the RTM process. To this end, the otherwise continuous transportation of the continous foam core, and also the sheathing with the fibre material, are stopped for this pressing step. Preferably, the foam core material is completely surrounded by the fibre material here. It is moreover preferable that by use of the compression mould the ends of the compressed section of the continuous foam core piece are pressed together with resin-saturated fibre wrapping in such a way that the resin-saturated fibre material completely or almost completely encloses the foam core. The temperature for the ultimate shaping in process step e) depends chiefly on the resin system used. In the case of resins that harden to give thermosets, the outer material thus hardens, and the given shape of the workpiece is thus also fixed. The hardening of the resin, which can also be termed reinforcement material, generally takes place thermally here. To ensure uniformly hardened workpieces, care must be taken to ensure a uniform distribution of temperature within the mould.

The temperature used for this purpose in the shaping mould depends on the respective resin used, and can easily be determined by the person skilled in the art. These temperatures are between 100 and 300° C. for some resins. In the case of epoxy resins, for example, this temperature is preferably between 20 and 100° C., more preferably between 50 and 80° C. As already noted, however, the resin system may also comprise a thermoplastic material. In this case, it is preferable to heat the mould on its inside not less than the softening temperature of these thermoplastics. Alternatively, it is also possible that the thermoplastic resin is applied to the fibres above the melting or glass transition temperature in process steps c) to e), and the "hardening" is effected only in process step f) by cooling.

In a particular embodiment of the invention, what are called hybrid rovings are used. These are also referred to as mingled or commingled yarns. These hybrid rovings are used in the form of fibre bundles comprising fibres of the fibre material of the outer layer and further fibres consisting of the thermoplastic that forms the matrix material. Thus, process step c) is to a certain degree effected partly together with process step b), in such a way that the fibres are woven together here, and secondly in process step e), in which the thermoplastic fibres are melted to form the matrix material.

The cooling can simply be effected on withdrawal by virtue of the ambient temperature. This can additionally be supported, for example, by fans. It is also possible that the transport carriage is cooled. In the latter variant, it is preferable that there is one transport carriage which can accommodate all the profiles simultaneously produced, or else that there is a dedicated carriage for each of these profiles that moves in parallel to the other transport carriages. In this case, ideally, the inside of the receiving apparatus of the transport carriage(s) reflects the shape of the shaped sections of the profiles. In the case of thermoplastic resins, the hardening of the outer layer also takes place here. A mould jacket comprising air or water or comprising other coolants can be present for the cooling process. The temperatures at which the cooling process takes place are generally from 0 to 120° C., preferably from 10 to 50° C. and more preferably from 20 to 30° C.

A major advantage of the shaping process according to the present invention is that it can take place continuously, and that a continuous profile divided into sections is thus then obtained. At the end of the plant, in process step h) this continuous profile is fully automatically separated into individual workpieces of desired length.

Process step f) comprises transporting the carriages comprising the closed shaping moulds in the direction of transport of the wrapped foam core, into a position 2. Once this position 2 is reached, the moulds are opened. The shaping moulds may here be formed on one conjoint carriage. Alternatively and similarly preferably, there are a plurality of, i.e. at least two, carriages, each comprising one of these moulds. The latter variant has the advantage that, when necessary, individual moulds are quicker and simpler, i.e. with less stoppage, to replace. The first variant has the advantage of lower capital and energy requirements.

To be able to operate the process in a continuous manner, then, the shaping mould carriages on the one hand and the transporting carriage(s) on the other have to move to and fro in mutually opposite directions and, while in motion, either the shaping carriages or the transporting carriage(s) are in a closed state and whichever is the other type of carriage is in an opened state. The two types of carriages here reach their respective turning points at ideally the same period to subsequently move in the mutually opposite directions following any stoppage period needed. The transportation in process step f) is concurred by process step b) for later profiles. The process is thereby carried out in a continuous manner.

The first stoppage period relates to process steps d) and e) and also, depending on the embodiment, c). During this stoppage, the mould carriages and the transporting carriages are in the mutually most apart positions 1 and 1a, respectively. During the second stoppage period, the moulds are opened and the transporting device is closed. At this point in time, the carriages are at the mutually closest positions 2 and 2a, respectively.

This is followed in process step g) by closing a transport mould on one or more further carriage(s), in position 2a, which is (are) situated, viewed in the direction of transport of the wrapped foam core, behind the other carriages. This is followed by transporting the wrapped foam core in the direction of transport into a position 1a, and also returning the mould carriage(s) to position 1.

At the first turning point of the two moulds at positions 1 and 1a, the carriages are maximally apart from each other, as described. In this position it is preferable that the following take place simultaneously: the removal of the finished profile or—this term being used synonymously hereinafter—workpiece from the transporting carriage(s) and the acceptance, into the carriages with the moulds, of the foam core wrapped with the fibre material. To this end, the moulds and/or the transporting carriages may actually be opened on the last stretch of travel before arriving at this position.

There are various possibilities for the transport of the continuous profile during the process. For instance, the continuous profile can be forwarded by way of rolls or hooks in front of or directly behind process step b). It is also possible that appropriate devices are used to pull the continuous profile in front of process step h). Transportation is preferably effect exclusively via the carriages or, to be more precise, via the particular mould which already contains a portion of the continuous profile. It is moreover possible to combine the various variants.

Process step h): After the transporting carriage has been opened, the individual profiles are separated by means of cutting or sawing or by means of another suitable method. This separation generally takes place at the same time as the shaping of another profile section in process steps d) and e), when the transport of the continous profile has been stopped for the shaping process. After the separation process, the removal of the finished workpiece by way of example by means of a robot arm, and the optional acceptance into a storage system take place.

The profile components produced by means of the process according to the invention have a sandwich structure with foam cores. The new process provided by the present invention has an immense advantage in that it can be practised in a continuous manner by using two or more shaping moulds in mutually concurrent operation. The following advantages can be realized as a result:

- Particularly high throughput due to two or more moulds being used and simultaneously short cycle times— thereby mass-production capability and achievement of high numbers
- Simultaneous production of profiles differing in shape by using different moulds for shaping
- Continuous production of complex geometries involving undercuts and cross-sectional changes
- No handling problems with the preform fibres
- The moulds are temperature-controllable, and it is therefore possible to process not only thermoset matrices but also thermoplastic matrices.
- The moulds and the transporting carriage exert a pulling and tension-maintaining effect on the profiles. Optimum degrees of fibre orientation are achievable as a result.

Various profiles are obtainable with this process of the present invention. The profiles can have one or more chambers. Profiles with one chamber can by way of example take the form of a round tube or else of a rectangular or square profiled chamber. It is also possible to produce profiles with complex shape, i.e. two or more differently shaped or differently dimensioned chambers. Round tubes can by way of example have not only a simple round shape, with round foam core and round jacket, but can also by way of example have a round foam core and a polygonal jacket, or a polygonal foam core and a round jacket. Irrespective of the shape and the number of chambers, the continuous profile can be produced with various wall thicknesses and/or foam core dimensions.

According to the invention, it is in particular possible, in particular by means of the pul-shape process described, to realize curved workpieces and profiles, or else workpieces and profiles that have non-uniform shape in the direction of transport.

The material used for the foam core is preferably poly (meth)acrylimide, for which this text uses the abbreviation P(M)I. (Meth)acryl-here means methacryl-, acryl- or mixtures of the two. Particular preference is given to PMI foams. These PMI foams are normally produced in a two-stage process: a) production of a cast polymer and b) foaming of said cast polymer. However, it is also alternatively possible to use foam cores made of other rigid foam materials, particular examples being PET foams, PVC foams, PU foams or PP foams. However, PMI foams have the major advantage that these undergo further foaming in the first and/or second mould, thus giving particularly good adhesion at the boundary between the foam core and the outer layers.

The foam parts required as core material for the process can either be produced by a production process using in-mould foaming or else can preferably be cut, sawn or milled from foamed sheets which can be produced as cast polymers. It is preferably possible here to cut a plurality of foam parts from one sheet. In one particular alternative, it is also optionally possible that the offcut material from the production of relatively large PMI foam parts of the type used by way of example in aircraft construction or in the construction of wind turbines is chopped and used.

The production of these PMI foams is known in principle to the person skilled in the art and can be found by way of example in EP 1 444 293, EP 1 678 244 or WO 2011/138060.

It is particularly preferable to use, as material for the foam core, PMI foams in a density range from 30 to 200 kg/m$^3$. PMI foams that may be mentioned in particular are ROHACELL® grades from Evonik Industries AG.

The advantage of sawn, cut or milled foam core pieces here over pieces produced by means of in-mould foaming is that they have open pores at the surface. During contact with the fibres and the subsequent impregnation with the resin, some of the resin penetrates into these open pores at the foam core surface. This has the advantage that hardening gives particularly strong adhesion at the boundary between foam core and jacket material.

As already stated, it is possible by means of the process according to the invention to process other rigid foams as well. These may especially be rigid PET foams, PVC foams, PP foams or PU foams.

Rigid PVC foams are usually used in the composite with outer layers as sandwich material in boatbuilding, rotor blades or motor vehicles. PVC foam is commercially available in the density range from 25 to 300 kg/m$^3$, and is used on a large scale. PVC foams have particularly high high-temperature stability but only limited mechanical durability.

PP foams are especially known as insulation material, in transport containers and as sandwich material. PP foams can comprise fillers and are available commercially, mostly in a density range from 20 to 200 kg/m$^3$. For better adhesion, it is especially possible to provide the surfaces of a PP foam with an adhesive layer or an adhesion promoter before process step a).

Features of rigid PU foams, in comparison with flexible PU foams, are in turn a more closed pore structure and a higher degree of crosslinking. Rigid PU foams can also comprise relatively large amounts of inorganic filler materials.

A particular feature of the profile produced according to the invention, filled with a rigid foam, such as preferably a PMI foam, is that the outer material is a thermoset reinforced with fibre material, and the foam core is a PMI foam, and that the profile filled with PMI foam has no adhesive layer and no joins. The outer material moreover encloses the foam core entirely or with only very small gaps. The meaning of very small gaps here is that when the shaping process takes place in the compression mould, where the ends of the section, as described above, are pressed together, small regions of the foam core can continue to be visible after sawing or cutting. However, the compression process more preferably takes place in such a way that in the finished profile none of the foam core at all remains discernible from the outside. Equally preferably, at the interface between rigid foam core and the outside material the rigid foam core has open pores comprising matrix material.

In one particular embodiment, the rigid foam can comprise another material made of metal or of another plastic embedded in the foam material. This can by way of example be in the form of a tube. This type of tube can by way of example function as cable duct in the use in bodywork construction.

In addition, or irrespective thereof, the rigid foam can have inserts, in particular metallic inserts. These inserts serve subsequently as binding points for the component in the use by way of example in automobile construction or aircraft construction. It is possible here by way of example to introduce, as insert, a metal block into which a screw thread is then milled which then subsequently can be used for screw connections.

The profiles produced according to the invention with a foam core, in particular with a PMI foam core, or the mouldings produced by the process according to the invention, with a foam core, can be used in a variety of applications. An area of prime interest here is lightweight construction, but this description is in no way to be interpreted as restrictive. This relates in particular to automobile construction, commercial vehicle construction, shipbuilding, aircraft construction, helicopter construction, the construction of plants for obtaining energy from wind, robotics, and aerospace technology. In automobile construction, particular mention may be made by way of example of the construction of roof rails or floor struts. In aircrafts, mention may be made by way of example of the use as cabin floor support. In this type of use, the profiles according to the invention provide an alternative to aluminium or steel that is almost equivalent in mechanical terms but markedly lighter.

KEY TO THE DRAWINGS

The sole FIGURE illustrates the schematic construction of a plant suitable for the process of the present invention in its embodiment of a pul-press process with resin pre-injection. Key to sole FIGURE below:
(1) Foam core (available stock)
(2) Foam core (introduction into plant and connection to end of previous foam core)
(3), (4) Introduction of fibre, unidirectional
(5) Winding, braiding device (pul-braiding)
(6) Resin reservoir (in this case 2-component system with components A and B)
(7) Resin impregnation
(8) Mould 1 in carriage form for shaping
(9) Mould 2 in carriage form for shaping
(10) Transporting carriage, optionally with cooling equipment
(11) Cutting device
(12) Handling system for finished profiles The drawing is merely a schematic depiction of the embodiment referred to. The track whereahead the second and third moulds move may be distinctly longer, for instance. The plant as depicted is also equipped with two unidirectional fibrelines and two pul-braiding devices. One of these four devices will naturally also suffice to practise the process.

The invention claimed is:

1. A process for the continuous production of fibre-reinforced profiles comprising a foam core, said process comprising:
   a) introducing the foam core and connecting the newly introduced foam core to an end of a most recently introduced foam core, in a pultrusion plant,
   b) wrapping a fibre material around the foam core, to obtain a wrapped foam core comprising a fibre-material wrap,
   c) impregnating the fibre-material wrap with a resin,
   d) inserting different portions of the wrapped foam core in two or more moulds simultaneously, wherein the two or more moulds are situated on rowed mould carriages or in a row on one mould carriage in a position 1 at a downstream end of the pultrusion plant, and closing the two or more moulds,
   e) heating the two or more moulds to shape the wrapped foam core and optionally cure the resin,
   f) transporting the rowed mould carriages or the one mould carriage in a direction of transport of the wrapped foam core into a position 2 and then opening the two or more moulds,
   g) closing a transporting mould on a further carriage, in a position 2a, which is situated, viewed in the direction of transport of the wrapped foam core, behind the rowed mould carriages or the one mould carriage and transporting the wrapped foam core in the direction of transport into a position 1a, and also returning the rowed mould carriages or the one mould carriage to position 1, and
   h) opening the transporting mould, separating individual profiles and removing the individual profiles, and also concurrent practice of a) to d).

2. The process of claim 1, wherein the foam core takes the form of a plurality of successive individual pieces when it is continuously passed into the pultrusion plant, and the individual pieces are connected to one another by adhesion bonding or insertion or through addition of a coupling piece.

3. The process of claim 1, wherein the fibre material comprises carbon fibres, glass fibres, polymer fibres, aramid fibres, textile fibres, or carbon fibres, used in the form of individual fibres, ravings and/or nonwovens, wovens and/or scrims, and
   the resin comprises a thermoset, wherein the thermoset may be a material formed from a polyester, vinyl ester, phenolic, polyurethane or epoxy resin.

4. The process of claim 1, wherein the foam core is made of poly(meth)acrylimide.

5. The process of claim 4, wherein the foam core is made of polymethacrylimide with a density in a range of from 30 to 200 kg/m³.

6. The process of claim 1, wherein b) takes place by analogy with a pultrusion process with foam core introduction in the form of a modified pul-preforming, pull-winding or pul-braiding process.

7. The process of claim 1, wherein the process is practiced as a pul-shape process wherein c), d), e) and f) are practiced in the same moulds in each case.

8. The process of claim 1, wherein the process is practiced as a pul-press process wherein to d) are carried out in mutually separate moulds/devices, optionally the wrapped foam core is preshaped in further moulds between c) and d), and c) takes place before b).

9. The process of claim 1, wherein d) to f) are conducted concurrently in two or three moulds.

10. The process of claim 1, wherein the moulds of d) to f) produce different shapes and thus lead to different profiles as end product.

11. The process of claim 1, wherein the process can produce at least 70 fibre-reinforced profiles per hour.

* * * * *